US011131083B2

(12) United States Patent
Gratton et al.

(10) Patent No.: US 11,131,083 B2
(45) Date of Patent: Sep. 28, 2021

(54) VEHICLE STABILITY WARNING SYSTEM

(71) Applicant: DEERE & COMPANY, Moline, IL (US)

(72) Inventors: Michael R. Gratton, Asbury, IA (US); David Myers, Cedar Falls, IA (US); Aaron R. Kenkel, East Dubuque, IL (US); Michael G. Kean, Maquoketa, IL (US); Mary B. Wigginton, Dubuque, IA (US); Grant R. Henn, Dubuque, IA (US); Todd F. Velde, Dubuque, IA (US); Joseph R. Keene, Asbury, IA (US); Dustin T. Staade, Dubuque, IA (US); Kevin Campbell, Dubuque, IA (US); Thomas L. Kennedy, Dubuque, IA (US); William Staidl, Hazel Green, WI (US)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 16/670,021

(22) Filed: Oct. 31, 2019

(65) Prior Publication Data

US 2021/0131072 A1   May 6, 2021

(51) Int. Cl.
*E02F 9/26* (2006.01)
*G07C 5/08* (2006.01)
*B60Q 9/00* (2006.01)
*E02F 3/34* (2006.01)
*G01C 21/00* (2006.01)
*B60Q 5/00* (2006.01)

(52) U.S. Cl.
CPC ............... *E02F 9/26* (2013.01); *B60Q 5/005* (2013.01); *B60Q 9/00* (2013.01); *E02F 3/34* (2013.01); *E02F 9/261* (2013.01); *G01C 21/005* (2013.01); *G07C 5/08* (2013.01)

(58) Field of Classification Search
CPC ........ G01C 21/005; B60Q 9/00; B60Q 5/005; G07C 5/08; E02F 9/26; E02F 3/34; E02F 9/261
See application file for complete search history.

(56) References Cited

U.S. PATENT DOCUMENTS

| | | | | |
|---|---|---|---|---|
| 3,720,446 A | * | 3/1973 | Kelley | ....................... B60P 1/04 |
| | | | | 298/22 R |
| 4,647,053 A | * | 3/1987 | Kanno | .................... B62D 37/00 |
| | | | | 280/6.154 |
| 6,225,574 B1 | * | 5/2001 | Chang | ................... G01G 23/002 |
| | | | | 177/139 |

(Continued)

FOREIGN PATENT DOCUMENTS

| | | | | |
|---|---|---|---|---|
| WO | WO-2006106296 A1 | * | 10/2006 | ............. B60P 1/045 |
| WO | WO-2012005779 A1 | * | 1/2012 | ........... B62D 55/075 |

*Primary Examiner* — Tyler J Lee
(74) *Attorney, Agent, or Firm* — Taft Stettinius & Hollister LLP; Stephen F. Rost

(57) ABSTRACT

A work machine that has a chassis, a payload section, a controller, a payload sensor in communication with the controller, and an orientation sensor that identifies the orientation of the work machine to the controller. The controller determines a center of gravity for the work machine considering a payload weight identified by the payload sensor and sends an alert when the location of the center of gravity and the orientation of the work machine create an unstable condition.

18 Claims, 9 Drawing Sheets

(56) References Cited

U.S. PATENT DOCUMENTS

| | | | |
|---|---|---|---|
| 6,518,519 B1* | 2/2003 | Crane, III | E02F 9/264 |
| | | | 177/136 |
| 7,369,978 B1* | 5/2008 | Hagenbuch | G06T 19/00 |
| | | | 703/8 |
| 8,818,699 B2 | 8/2014 | Nichols et al. | |
| 8,909,437 B2* | 12/2014 | Zhu | E02F 3/435 |
| | | | 701/50 |
| 9,550,561 B1* | 1/2017 | Beckman | B64C 17/00 |
| 9,956,842 B2* | 5/2018 | Muir | E01C 23/127 |
| 9,970,767 B2* | 5/2018 | Humphrey | E21F 17/18 |
| 10,207,794 B1* | 2/2019 | Beckman | B64C 17/00 |
| 10,684,182 B2* | 6/2020 | Meid | A01B 63/10 |
| 2007/0027596 A1* | 2/2007 | Stavroff | B60W 30/04 |
| | | | 701/38 |
| 2008/0319710 A1* | 12/2008 | Hsu | E02F 9/264 |
| | | | 702/174 |
| 2009/0139119 A1* | 6/2009 | Janardhan | E02F 9/264 |
| | | | 37/413 |
| 2009/0143896 A1* | 6/2009 | Janardhan | B25J 9/1638 |
| | | | 700/213 |
| 2010/0204891 A1* | 8/2010 | Biggerstaff | E02F 9/2029 |
| | | | 701/50 |
| 2012/0205169 A1 | 8/2012 | Montocchio et al. | |
| 2018/0354625 A1* | 12/2018 | Verkade | B64C 39/024 |
| 2019/0031073 A1* | 1/2019 | Ratcliffe | B60P 1/283 |
| 2021/0131072 A1* | 5/2021 | Gratton | B60Q 5/005 |

\* cited by examiner

VEHICLE STABILITY WARNING SYSTEM

FIELD OF THE DISCLOSURE

The present disclosure relates generally to identifying unstable conditions of a work machine and more specifically determining a variable center of gravity as part of the stability consideration.

BACKGROUND

Many work machines routinely encounter situations that cause the work machine to become unstable. Often, the user must analyze the surrounding environment to determine scenarios that may cause an unstable condition of the work machine. Further, the user must be familiar with the conditions of the work machine, such as the amount of debris in an implement or the positioning thereof. Further, the user must survey the surrounding area to identify topographical changes that may cause unstable conditions of the implement. In the typical work machine, if the user is unaware of a condition of the work machine or the surrounding environment the user may unintentionally create an unstable condition for the work machine.

SUMMARY

One embodiment is a work machine that has a chassis, a payload section, a controller, and a payload sensor in communication with the controller. The controller determines a center of gravity for the work machine considering a payload weight identified by the payload sensor.

One example of this embodiment has a payload position assembly that identifies to the controller the location of the payload section relative to the chassis, wherein the controller considers the location of the payload section in determining the center of gravity. Another example has an orientation sensor on the work machine that identifies the orientation of the work machine to the controller, wherein the controller sends an alert when the location of the center of gravity and the orientation of the work machine create an unstable condition. One aspect of this example has a sensor that communicates with the controller to identify the surrounding topography, wherein the controller considers the surrounding topography and the center of gravity to identify surrounding areas that will cause an unstable condition. In parts of this aspect, the sensor is a camera, one or more of lidar and radar, a combination of a camera and one or more of lidar and radar, or a GPS sensor. If the sensor is a GPS sensor, the controller accesses a topographical map and compares location identified by the GPS sensor to the topographical map to identify the surrounding areas that will cause an unstable condition. In one portion of this part the topographical map is selectively updated by a topographical system.

In another aspect of this example, the alert is one or more of auditory, visual, and haptic feedback.

Another embodiment of the present disclosure is a method for identifying an unstable condition of a work machine. The method includes providing a chassis, a controller, and a payload weight sensor, communicating to the controller with the payload weight sensor a weight of payload present in a payload section, and determining a center of gravity for the work machine with the controller using the weight of payload.

One example of this embodiment includes providing a payload position assembly and communicating to the controller with the payload position assembly a location of the payload section relative to the chassis. Wherein the controller uses the location of the payload section in determining the center of gravity. Another example includes providing an orientation sensor on the work machine, communicating orientation values from the orientation sensor to the controller, and determining the orientation of the work machine with the controller based on the orientation values. Wherein, the controller sends an alert when the location of the center of gravity and the orientation of the work machine create an unstable condition.

Yet another example of this embodiment includes providing a topography sensor that communicates with the controller to identify a surrounding topography and considering the surrounding topography, with the controller utilizing the topography sensor, and the center of gravity to identify surrounding areas that will cause an unstable condition. In one aspect of this example, the topographical sensor is a GPS sensor monitored by the controller to identify a vehicle location and the controller accesses a topographical map, wherein the controller compares the vehicle location to the topographical map to identify the surrounding areas that will cause the unstable condition. In part of this aspect, the controller communicates with a topographical system to selectively update the topographical map.

Yet another embodiment of this disclosure is a method for warning of instability in a work machine. The method includes providing a chassis having a payload section, a payload sensor in communication with a controller, an orientation sensor in communication with the controller, and a user interface, identifying a weight of material in the payload section with the controller through the payload sensor, determining a center of gravity of the work machine with the controller considering the weight of material in the payload section, monitoring the orientation sensor with the controller to identify an orientation of the work machine, identifying an unstable condition with the controller when the center of gravity and orientation of the work machine indicate the center of gravity is outside of a stability zone and providing a warning with the user interface to identify the unstable condition.

One example of this embodiment includes identifying a surrounding topography with the controller and predicting unstable conditions caused by the surrounding topography. One aspect of this example includes providing an indication with the user interface identifying the predicted unstable condition.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
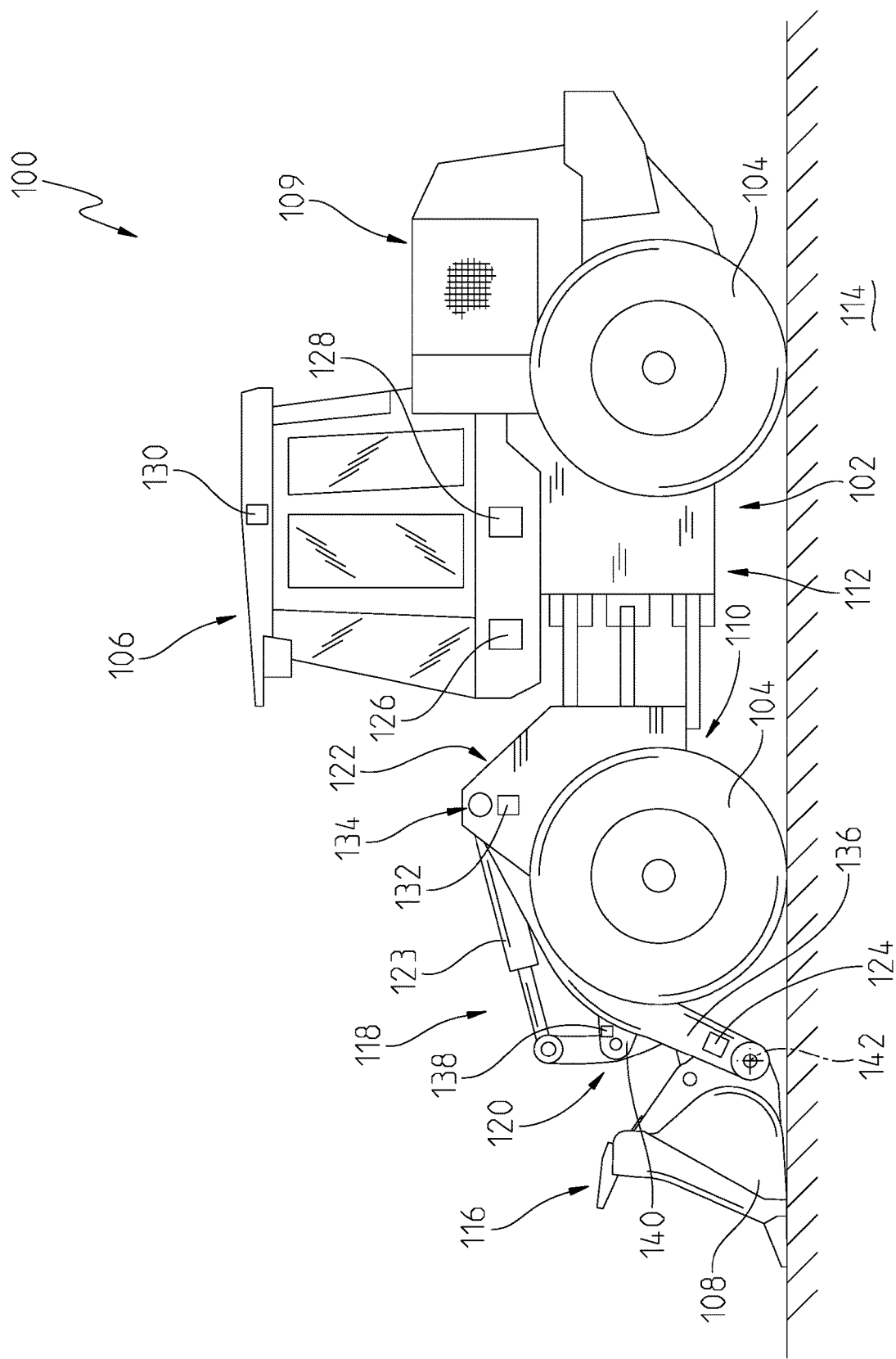
FIG. 1 is a side view of a loader.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

The present disclosure may apply generally to a work machine 100 as illustrated in FIG. 1. The work machine 100 may have a chassis 102 that is one or more frame or other structural member coupled to one another to provide a mounting location for ground engaging mechanisms 104, a cab 106, an implement 108, and a prime mover 109 among other things. In one non-exclusive example, the chassis 102 may have a first section 110 and a second section 112 pivotally coupled to one another to selectively alter the path of travel of the work machine 100. However, other embodiments considered herein may only have a single chassis 102 and the path of travel of the work machine 100 may be altered by mounting some, or all, of the ground engaging mechanisms to a steering assembly. In yet another example, the path of travel of the work machine may be selectively controlled by independently powering the ground engaging mechanisms 104. Accordingly, while a particular chassis configuration is illustrated in FIG. 1, this disclosure is applicable to any type of work machine and considers many different chassis applications.

In one non-exclusive example, the ground engaging mechanisms 104 may be wheel assemblies or the like. Some or all of the wheel assemblies may be selectively powered by the prime mover 109. Alternatively, the ground engaging mechanisms 104 may be two or more track assemblies. The track assemblies may also be selectively powered by the prime mover 109. In yet another embodiment, the ground engaging mechanisms 104 may be a combination of wheel and track assemblies. Regardless of the particular type of ground engaging mechanism, the ground engaging mechanisms 104 may provide an interface between the work machine 100 and an underlying surface 114 to selectively move the work machine 100 thereon.

The work machine 100 may have a payload section 116. The payload section 116 may include the implement 108 among other things. One non-exclusive example of an implement 108 may be a bucket or the like that can manipulate debris to execute a work function. The payload section 116 may be selectively repositioned relative to the chassis 102 with a payload position assembly 118. The payload position assembly 118 may have one or more linkage 120 that pivotally couple the implement 108 to the chassis 102. Further, the payload position assembly 118 may have an actuator 122 pivotally coupled to a primary linkage 136 to selectively reposition the implement 108 with the actuator 122. The actuator 122 may be a hydraulic, pneumatic, or electric actuator. Further, the actuator 122 may be a linear actuator wherein altering the length of the linear actuator alters the position or orientation of the implement 108.

In one example of a work machine 100, the actuator 122 may alter the position of the primary linkage 136 to raise and lower the implement 108. However, the work machine may also have an actuator 123 to control the orientation of the implement 108 regardless of the location of the primary linkage 136. Accordingly, the payload position assembly 118 may include any number of linkages 120 and actuators 122, 123 that can alter the orientation of the implement 108. In other words, the payload position assembly 118 may be capable of altering the height of the implement 108 relative to the chassis 102 as well as the angular orientation of the bucket or implement 108 relative to the chassis 102. In one configuration, the payload positioned assembly 118 may be capable of raising the implement above the underlying surface 114 and dumping debris therefrom as part of a work function.

The work machine 100 may also have a payload sensor 124. The payload sensor 124 may communicate with one or more controller 126 to identify the weight of any debris in the implement 108. In one non-exclusive example, the payload sensor 124 may send a signal to the controller 126 that identifies the weight of debris in the implement 108 when the implement 108 is spaced from the underlying surface 114. The payload sensor 124 may be positioned on the implement 108, linkages 120, actuator 122, chassis 102, or any other portion of the work machine 100 that can provide information to the controller 126 regarding the weight of debris in the implement 108.

In one non-exclusive example, the payload sensor 124 may include a dynamic payload weighing system configured to constantly measure the weight on the implement 108. More specifically, the dynamic payload weighing system may include an inertial measurement unit and a cylinder pressure measurement unit. In this embodiment, the inertial measurement unit and the cylinder pressure measurement unit can constantly determine the weight of debris in the implement 108 during operation of the work machine 100. The dynamic payload weighing system may communicate to the controller 126 to identify the current weight of the implement 108. This disclosure contemplates utilizing any one or more of the sensors and methods discussed herein for determining the weight of debris in the implement 108. Accordingly, any known method for identifying the weight of debris in the payload section 116 may utilize the teachings of this disclosure.

The payload position assembly 118 may also have one or more sensors thereon that provide information to the controller 126 regarding the location of the implement 108 relative to the chassis 102. More specifically, a first position sensor 132 may be located at or near a pivot 134 to determine an angle of rotation of the primary linkage 136 with respect to the chassis 102. In one embodiment, the first position sensor 132 is operatively connected to the primary linkage 136 by a four bar linkage as is understood by one skilled in the art. In another embodiment, the first position sensor 132 is located at the pivot 134. As the actuator 122 extends and retracts, the primary linkage 136 is raised and lowered with respect to the underlying surface 114. A second position sensor 138 is located at or near the pivot axis of a secondary linkage 140. As the actuator 123 extends and retracts, the bucket implement 108 rotates about a pivot axis 142. An output of the first position sensor 132 is used to determine a height of the implement 108 with respect to the underlying surface 114 and an output of the second position sensor 138 is used to determine the inclination of the implement 108 with respect to the primary linkage 136.

While specific sensor locations are described herein for the payload position assembly 118, this disclosure contemplates locating position sensors along any portion of the linkages 120 that may identify relatively movement thereof. In one non-exclusive example, the position of the rods of the actuators 122, 123 may be identified and communicated to the controller 126 via in-cylinder position sensors to thereby identify the position of the implement 108. Accordingly, any known position sensor assembly may be used to identify the position and orientation of the payload position assembly 118. For example, a model of the linkage kinematics may be used along with any of the position sensors discussed herein to determine the position of the linkages 120 and in turn the implement 108. In other words, the controller 126 may apply position sensor data to the known geometry of the linkages 120 to thereby calculate the position of the implement 108.

The work machine 100 may also have an orientation sensor 128 positioned thereon. The orientation sensor 128 may utilize one or more of gyroscopes, accelerometers, and the like to identify the orientation of the work machine 100 to the controller 126. More specifically, the controller 126 may be able to identify when the work machine 100 is on a hill or otherwise not oriented on a level underlying surface by monitoring the information provided by the orientation sensor 128.

The work machine 100 may also have one or more additional sensors 130 thereon. In one non-exclusive example, the additional sensors 130 may be a Global Positioning System ("GPS"). The GPS may communicate to the controller 126 the geographical location of the work machine 100 among other things. A camera may also be implemented as part of the additional sensors 130. The camera may be directed towards the underlying surface 114 surrounding the work machine. The controller 126 may monitor the data provided by the camera to identify grade changes and obstacles of the underlying surface among other things. Similarly, the additional sensors 130 may include one or more of a lidar and radar sensor. The lidar and radar sensors may communicate with the controller 126 to identify grade changes and obstacles of the underlying surface among other things.

The one or more additional sensors 130 may include any combination of the sensors discussed herein. In one non-exclusive example, the additional sensors 130 may include GPS, a camera, lidar, and radar. Alternatively, only one of the sensors discussed herein for the additional sensors 130 may communicate with the controller 126. Further still, in yet another embodiment the work machine 100 may not have an additional sensor 130 at all.

Figure 2:
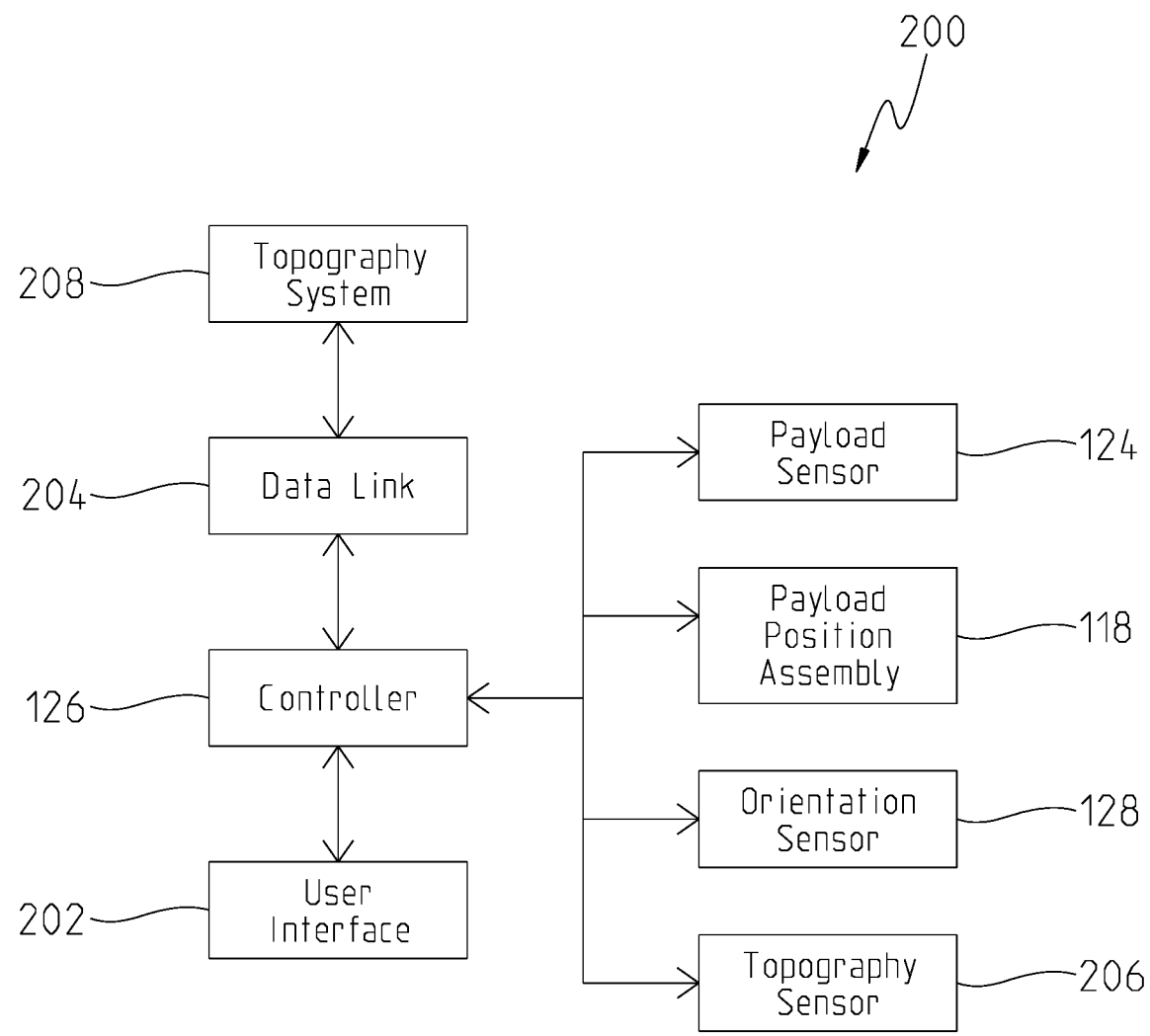
FIG. 2 is a schematic view of components of the loader of FIG. 1.

Referring now to FIG. 2, a schematic view 200 of some of the components of the work machine 100 are illustrated. More specifically, the controller 126 may communicate with the payload sensor 124, payload position assembly 118, and orientation sensor 128 of the work machine 100 as described herein with reference to FIG. 1. Further, the controller 126 may also communicate with a user interface 202. In one non-exclusive example, the user interface 202 may be one or more components positioned in the cab 106 of the work machine 100 to provide feedback and inputs to a user. For example, the user interface 202 may include buttons, screens, lights, switches, and any other device that provides a means for the user to communicate with the controller 126 and vice versa. In one aspect of this disclosure, the user interface provides components that can provide one or more of auditory, visual, or haptic feedback to a user. More specifically, the user interface 202 may include one or more of a screen or touchscreen for visual feedback, a speaker or the like for auditory feedback, and vibrating components for haptic feedback.

The controller 126 may also have access to a data link 204. The data link 204 may provide wireless access to data via any known wireless protocol. More specifically, the controller 126 may communicate with the data link 204 to gain access to data on a wireless network such as wireless networks typically used for wireless phones and computer systems. Further still, the data link 204 may provide access to local wireless networks as well to allow the controller 126 to communicate wirelessly with local systems via wireless protocols such as Wi-Fi, Bluetooth, and any other radio frequency or known wireless protocol.

The controller 126 may also communicate with one or more topographical sensor 206 to identify the topography of the area surrounding the work machine 100. The topographical sensor 206 may be one of the other sensors 130 described herein. In one non-exclusive example, the topographical sensor 206 is a GPS and the data link 204 is utilized to identify surrounding topographical data based on the geographic location of the work machine 100. In other words, the GPS may identify the geographic location of the work machine 100 and the data link 204 may communicate with a database to identify the surrounding topographical information.

The topography sensor 206 may also be one or more of the camera, lidar, and radar sensor discussed herein for the other sensors 130. The camera, lidar, and radar sensor may communicate with the controller 126 to identify the surrounding topography based on active readings of the sensor communicated to the controller 126. The controller 126 may then analyze the readings of the topography sensor 206 to identify topographical changes to the underlying surface 114 surrounding the work machine 100.

The controller 126 may also utilize the data link 204 to communicate with a topography system 208. The topography system 208 may be a separate system comprising sensors and location data specifically configured to identify the topography of the area around the work machine 100. As one non-exclusive example of a topography system 208, the controller 128 may utilize the data link 204 to communicate with an aerial topography system. The aerial topography system may utilize aerial assemblies having one or more of a camera, radar, lidar, and GPS among other sensors to determine the precise topography of the area surrounding the work machine 100. The controller 126 may communicate with the topography system 208 to identify the surrounding topographical conditions. In one non-exclusive example, the topography system 208 may utilize unmanned flying assemblies, or drones, to identify the surrounding topographical information to the controller 126.

In one aspect of this disclosure, the controller 126 may utilize the sensors and systems described herein to determine a center of gravity of the work machine 100 based on the weight of debris in the payload section 116 along with the position of the payload section 116. More specifically, the payload sensor 124 may be utilized to by the controller 126 to determine the weight of debris in the payload section and the sensors of the payload position assembly 118 may be considered by the controller 126 to identify the position of the payload section 116. Further, by identifying the weight of debris in the payload section 116 and the location of the payload section 116 relative to the chassis 102, the center of gravity for the work machine 100 can be actively determined based on the real time conditions of the work machine 100.

Referring now to FIGS. 3a-3d, several non-exclusive examples of a center of gravity ("COG") 300 are illustrated with the work machine 100 in different configurations. Also illustrated in FIGS. 3a-3d is a schematic stability zone 302. The stability zone 302 may be a region of the work machine 100 that represents stable locations for the COG 300. When the COG 300 is positioned within the stability zone 302, the work machine 100 may be in a stable configuration. However, if the COG 300 becomes positioned outside of the stability zone 302, the work machine 100 may be in an unstable condition. The stability zone 302 may a three dimensional area that is defined based on known characteristics of the geometry, weight, and orientation of the work machine 100 to represent location for the COG 300 that would be stable. In other words, if the COG 300 is within the stability zone 302 the work machine 100 will not be at risk of tipping over or otherwise becoming unstable. While only two-dimensional examples of the stability zone 302 our illustrated, the stability zone 302 is a three-dimensional zone that represents stable locations for the COG 300 in all directions.

Figure 5A:
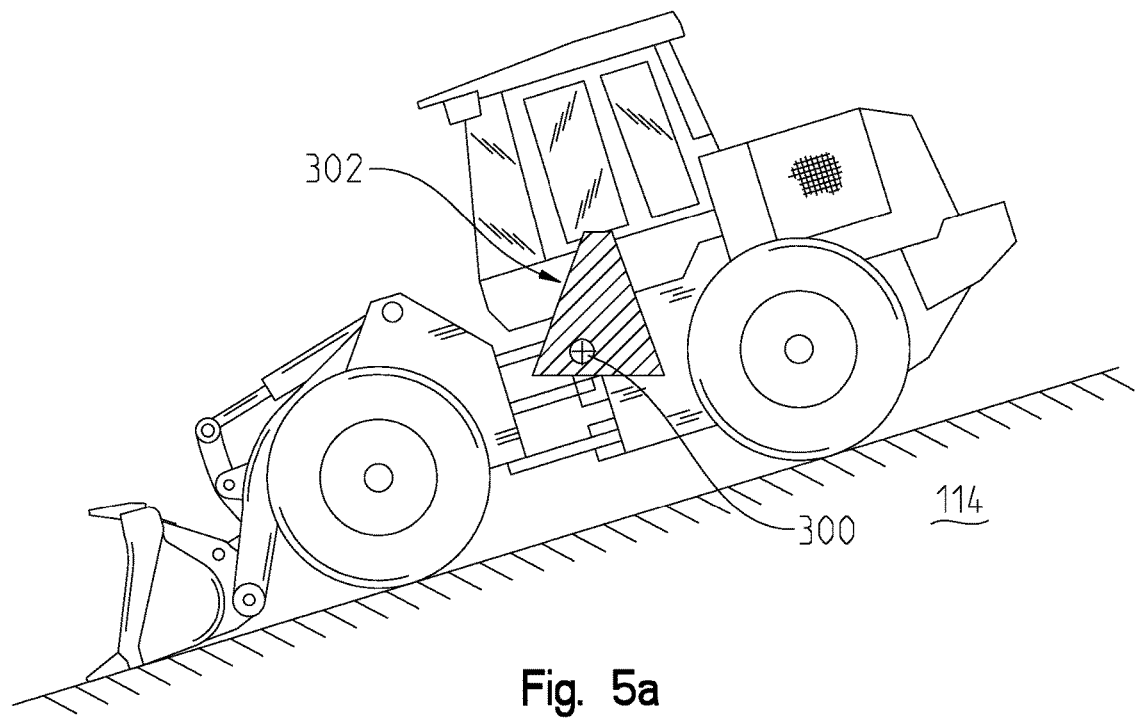
FIG. 5a is a side view of the loader of FIG. 1 facing downgrade and having the payload section in a lowered position.
Figure 5B:
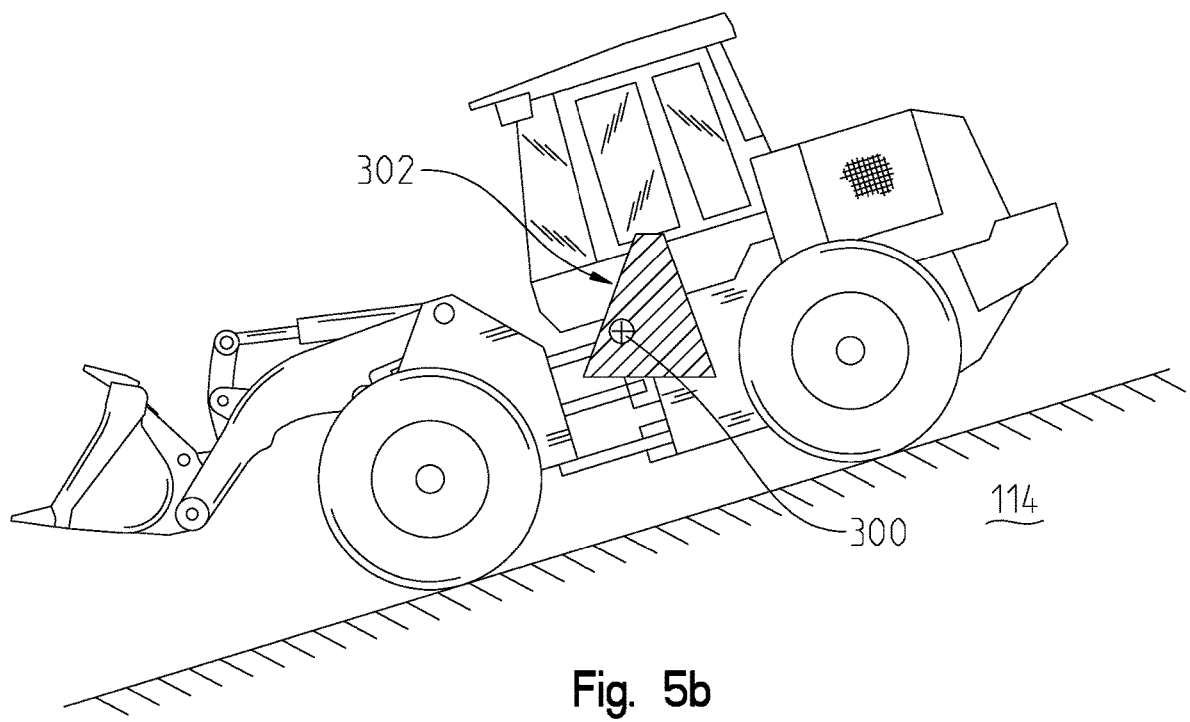
FIG. 5b is a side view of the loader of FIG. 1 facing downgrade and having the payload section in a partially raised position.

The stability zone 302 may be determined based on the orientation of the work machine 100 as identified by the orientation sensor 128. For example, in FIGS. 3a-3d, the stability zone 302 may be substantially the same because the work machine 100 remains on a substantially level underlying surface 114. However, in FIGS. 5a-5b the stability zone 302 may become angularly offset towards the prime mover 109 or the rear end of the work machine 100 as the implement 108 or front end is positioned down grade from the rear end (i.e. when travelling down a hill). In the configuration of FIGS. 5a-5b, the center of gravity 300 is shifted towards the front end compared to the embodiments of FIGS. 3a-3d because the work machine 100 is travelling down grade. Accordingly, the stability zone 302 may become biased towards the rear end during the down grade to ensure the COG 300 is being compared to a stability zone 302 that properly considers the orientation of the work machine 100.

In addition to modifying the stability zone 302 based on the orientation of the work machine 100 on the underlying surface, the location and weight of the payload section 116 may be considered to alter the location of the COG 300. More specifically, in FIG. 3a the payload section 116 may be substantially resting on the underlying surface 114. In this configuration, the payload sensor 124 may not identify any weight of debris in the payload section 116 because it is resting on the underlying surface. Further, the sensors of the payload position assembly 118 may communicate with the controller 126 to identify that the payload section 116 is on or near the underlying surface 114. Accordingly, in the embodiment of FIG. 3a the center of gravity 300 may be lower than the illustrated embodiments of FIGS. 3b-3d.

Figure 3A:
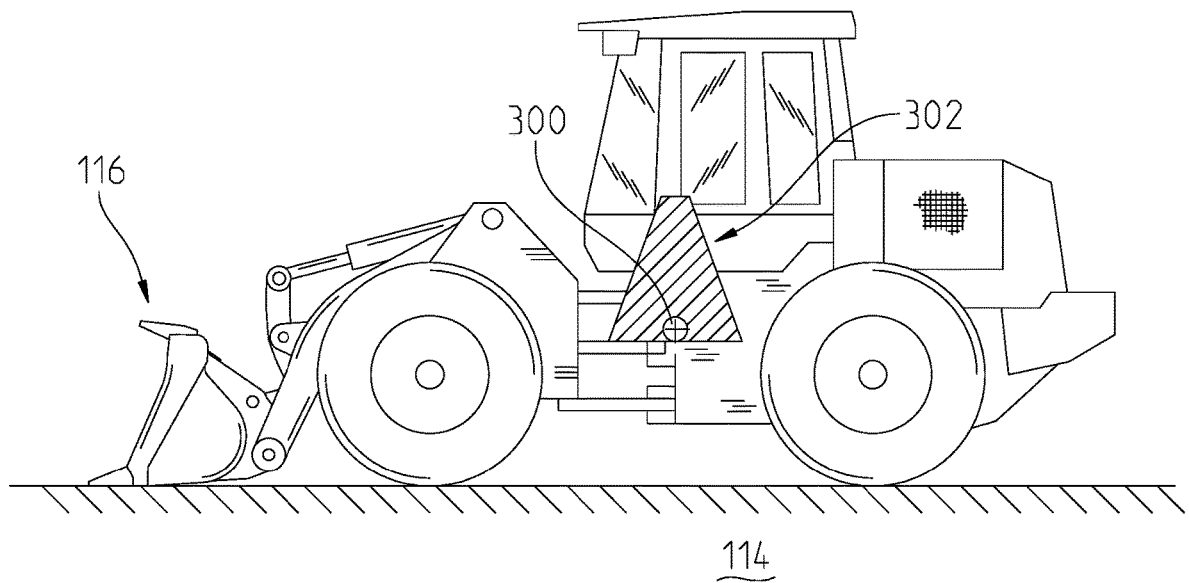
FIG. 3a is a side view of the loader of FIG. 1 with a payload section in a lowered position.
Figure 3B:
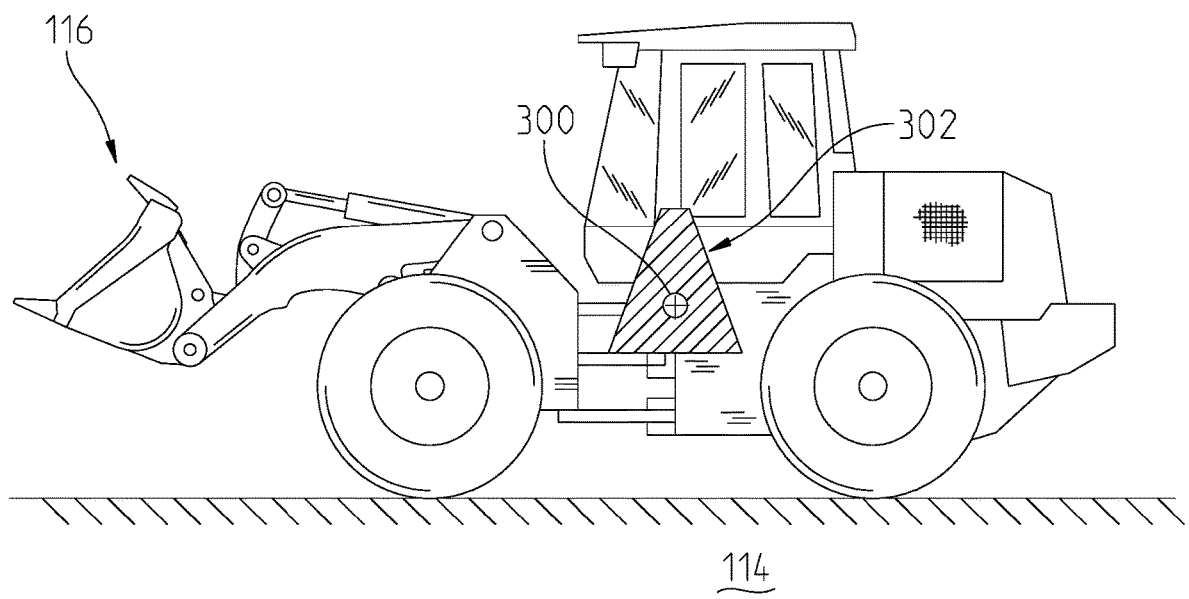
FIG. 3b is a side view of the loader of FIG. 1 with a payload section in a partially raised position.

In FIG. 3b, the payload section 116 may be at least partially elevated above the underlying surface 116 and contain at least some weight of debris therein. The sensors of the payload position assembly 118 may communicate the position of one or more of the corresponding linkages 120 and actuators 122, 123 to the controller 126 to allow the controller 126 to thereby determine the position of the payload section 116. Further, the controller 126 may communicate with the payload sensor 124 to identify the weight of debris in the payload section 116. Once the position and weight of the payload section 116 is identified, the controller 126 may determine the current position of the COG 300 of the work machine 100. In the embodiment of FIG. 3b, the COG 300 may be slightly higher than the embodiment of FIG. 3a because the weighted payload section 116 of FIG. 3b is raised relative to the embodiment of FIG. 3a. Accordingly, when the controller calculates or otherwise determines the COG 300 for FIG. 3b, the raised and weighted payload section 116 may cause the COG 300 to raise relative to the embodiment of FIG. 3a.

Figure 3C:
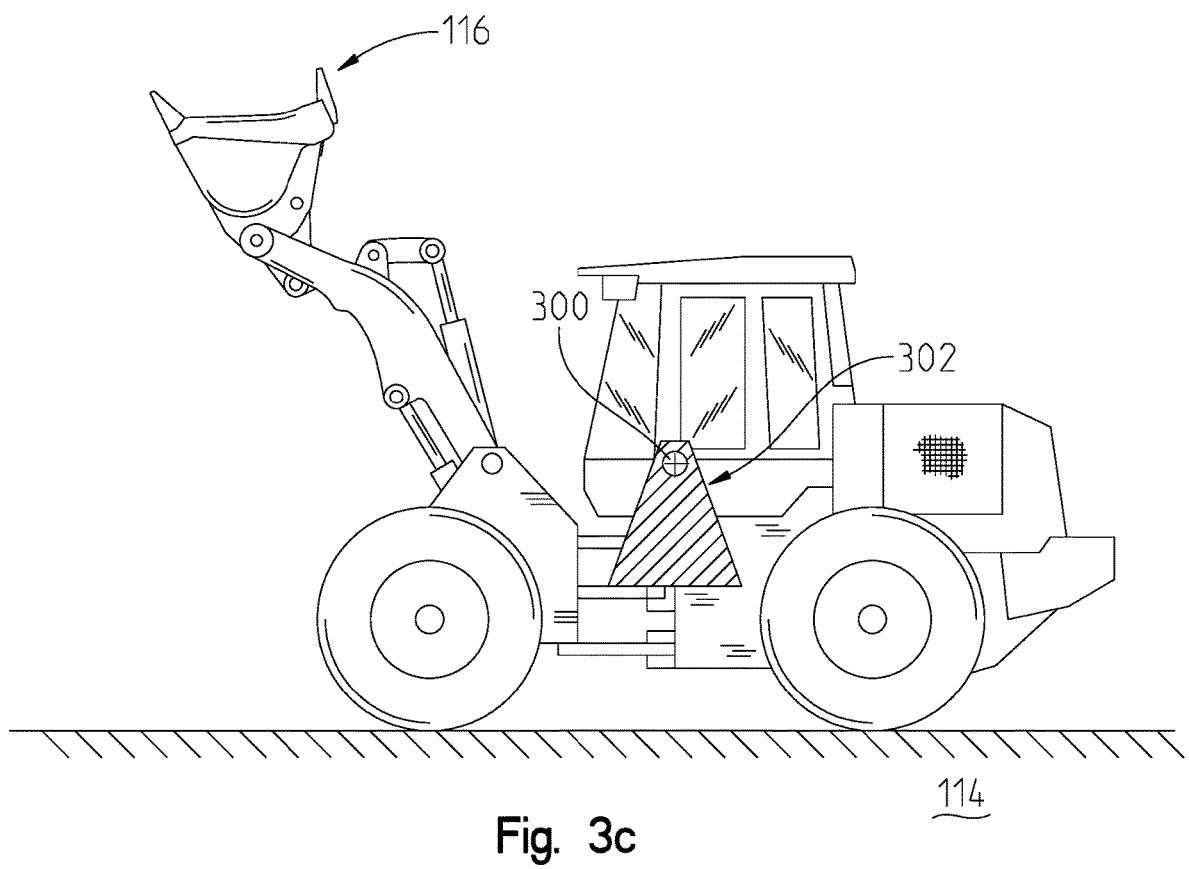
FIG. 3c is a side view of the loader of FIG. 1 with a payload section in a raised position.

Similarly, in FIG. 3c the work machine 100 may have a weighted payload section 116 in a high position. The controller 126 may communicate with the payload sensor 124 and sensors of the payload position assembly 118 to identify the position and weight of the payload section 116 as discussed herein. Accordingly, the COG 300 for FIG. 3c may be higher than that of FIGS. 3a and 3b. In other words, in FIG. 3c the raised weighted payload section 116 is considered as the controller 126 determines the current COG 300 in the configuration illustrated.

Figure 3D:
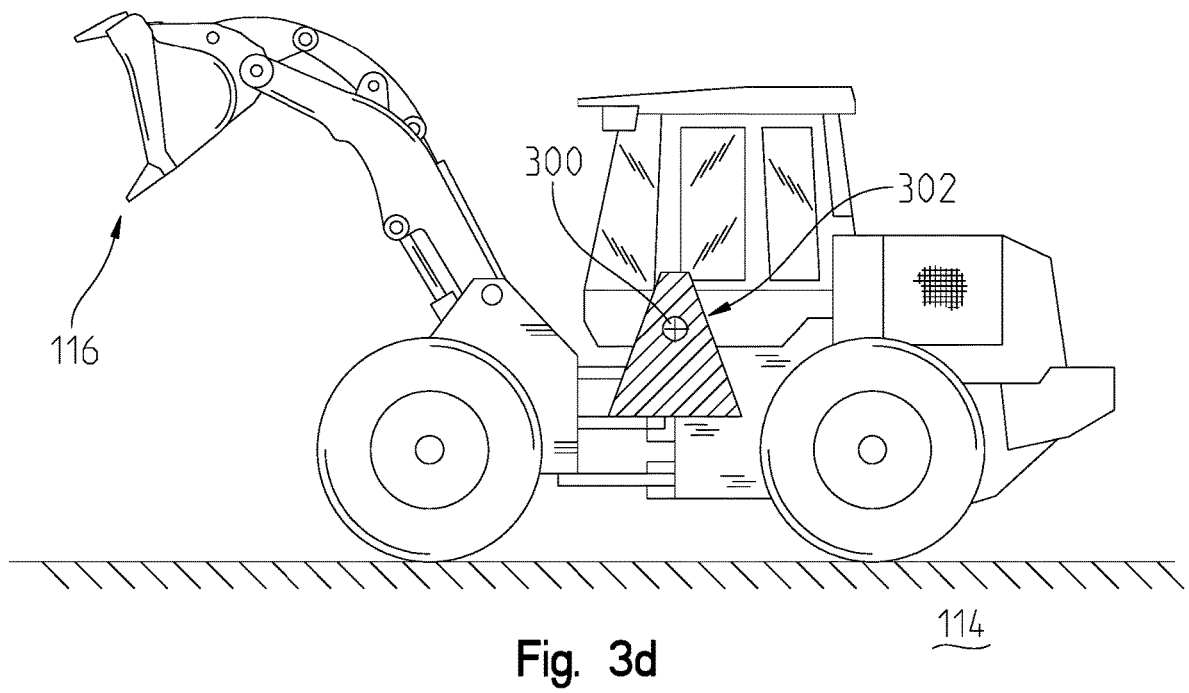
FIG. 3d is a side view of the loader of FIG. 1 with a payload section in a raised dump position.

In FIG. 3d, the payload section 116 may be in a dump configuration wherein a majority of the debris in the payload section 116 is removed. In this configuration, the payload section 116 may be positioned in a similar location as FIG. 3c but the weighted debris is removed therefrom. The payload sensor 124 may communicate the reduce weight of debris in the payload section 116 to the controller 126 and the COG 300 for FIG. 3d may be comparatively lower to that of FIG. 3c because of the reduced debris weight in the highly positioned payload section 116.

Figure 5C:
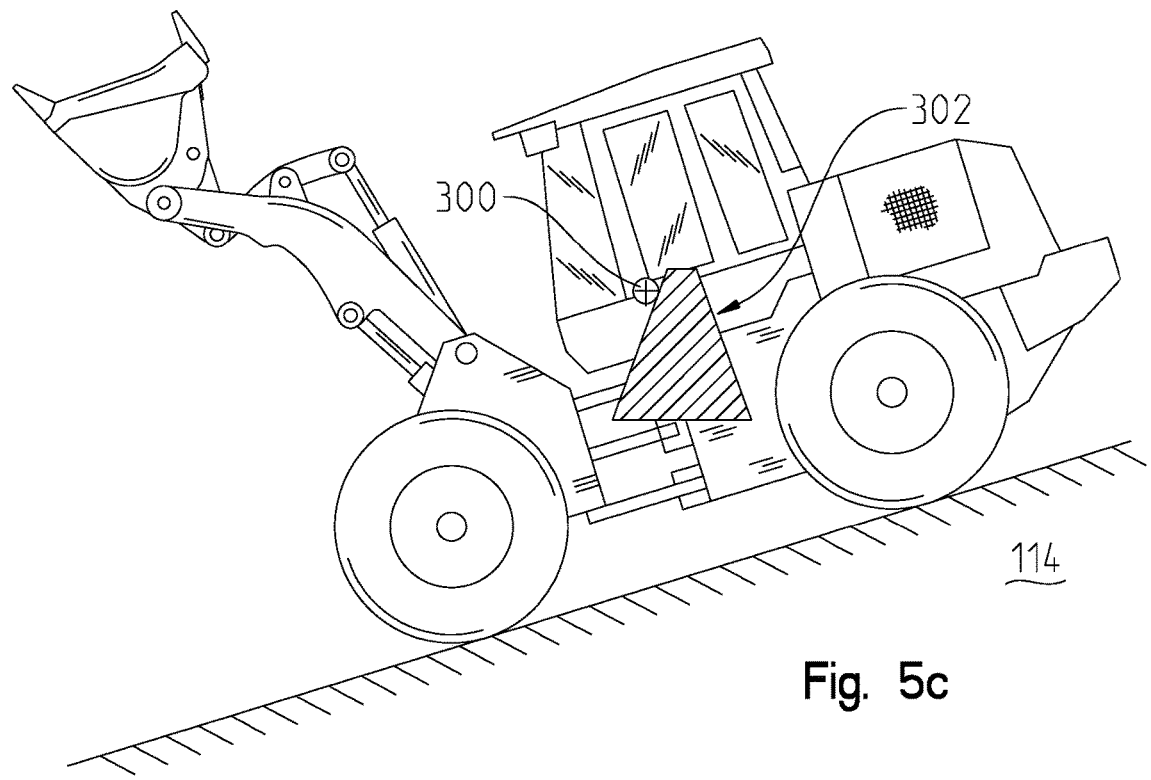
FIG. 5c is a side view of the loader of FIG. 1 facing downgrade and having the payload section in a raised position.
Figure 5D:
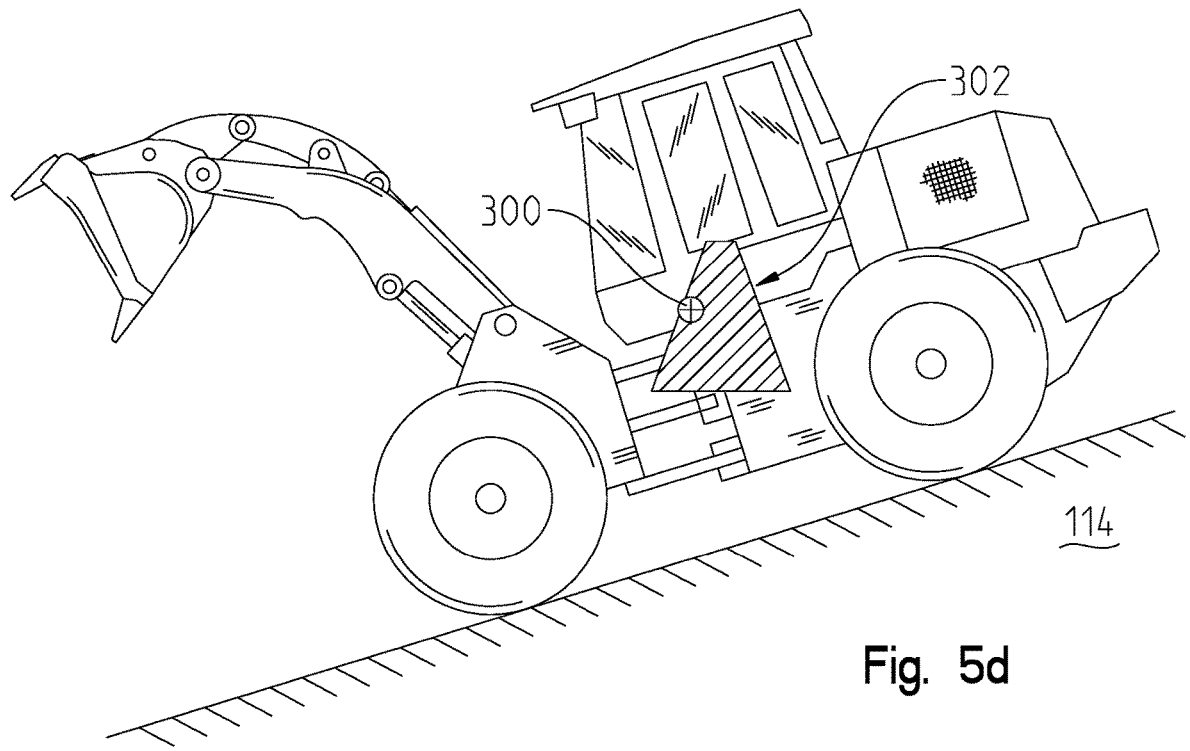
FIG. 5d is a side view of the loader of FIG. 1 facing downgrade and having the payload section in a raised dump position.

In one aspect of this disclosure, the active location of the center of gravity 300 may be compared to the stability zone 302 to identify unstable conditions based on the real time determination of the center of gravity and stability zone. As one non-exclusive example, when the work machine 100 is positioned on a hill with a mild grade as illustrated in FIG. 5a, the controller 126 may determine that the work machine 100 is stable based on the location of the COG 300 in view of the corresponding stability zone. In other words, in FIG. 5a the COG 300 remains in the stability zone 302 and the controller 126 determines that the work machine 100 is in a stable orientation. However, if the work machine 100 is on the same mild grade but in the configuration of FIG. 5c (i.e. raised and weighted payload section 116), the COG 300 may be higher on the work machine 100 compared to the configuration of FIG. 5a. While the stability zone 302 of FIGS. 5a and 5c may be the same, the change in the location of the COG 300 may result in the controller 126 identifying an unstable condition for FIG. 5c. In other words, the work machine 100 may have been stable on the mild grade while the payload section 116 was lowered as in FIG. 5a, when the payload section 116 is raise as illustrated in FIG. 5c the COG 300 become positioned outside of the stability zone 302 and the work machine 100 becomes unstable.

Figure 4A:
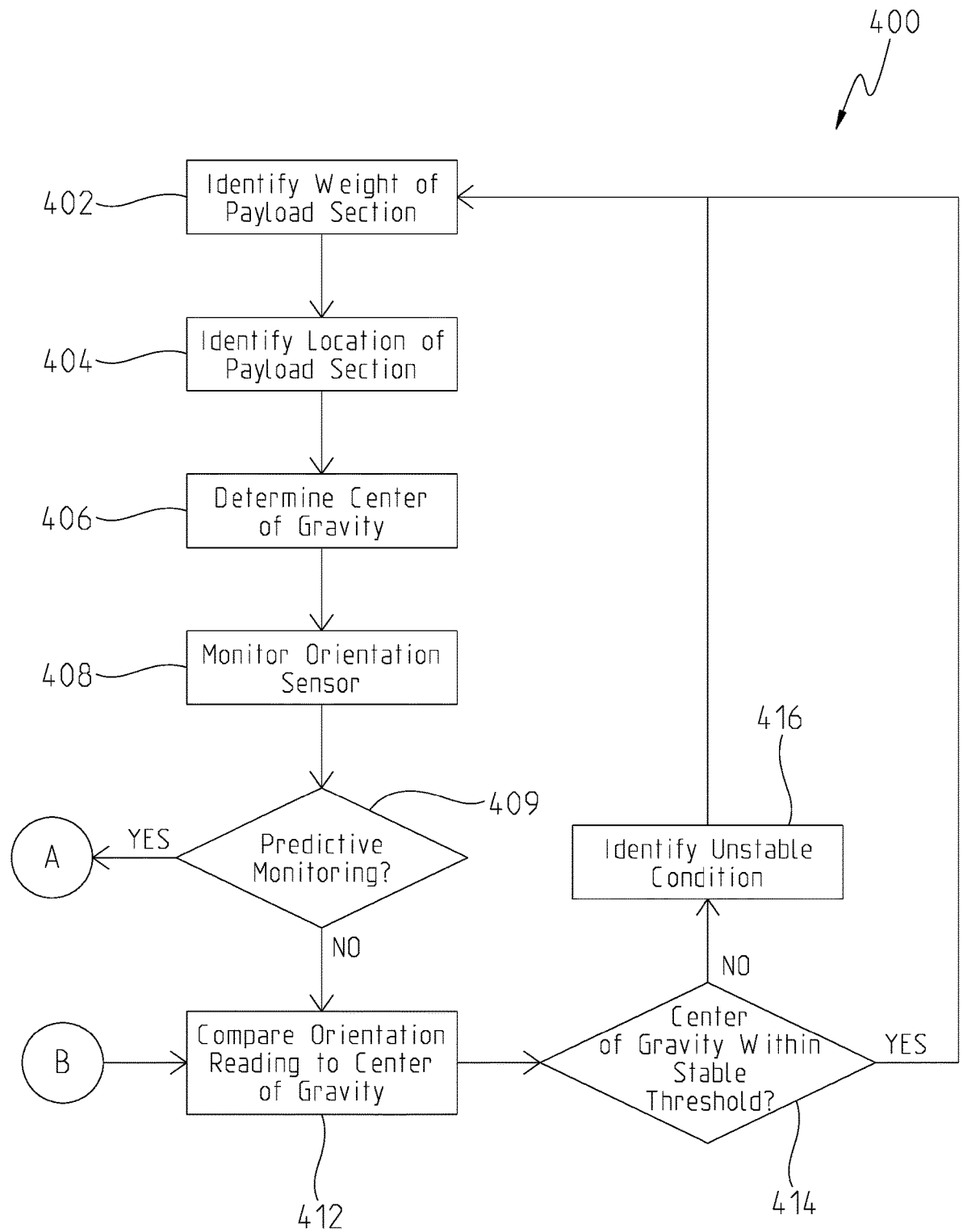
FIGS. 4a-4b are schematic diagrams of a logic control system.

Referring now to FIG. 4, a schematic logic control system 400 is illustrated for identifying unstable conditions based on an active determination of the center of gravity and stability zone. The schematic control system 400 may be implemented by the controller 126. Alternatively, the schematic control system 400 may be implemented entirely, or in part, by other controllers of the work machine 100. In one non-exclusive example, algorithms, equations, databases, lookup tables, threshold values, and the like for the logic control system 400 may be stored on a memory unit or the like of the controller 126. Further, the controller 126 may have access to one or more processor that may execute the logic control system 400 as discussed herein.

In box 402, the controller 126 may communicate with the payload sensor 124 to identify the current weight of any debris in the payload section 116 as discussed herein. Similarly, in box 404 the controller 126 may communication with sensors of the payload position assembly 118 to identify the current position and orientation of the payload section 116. Next, the controller 126 may utilize the current weight identified in box 402 and the current position and orientation of box 404 to calculate or otherwise determine the current center of gravity in box 406. In one example of this disclosure, the current center of gravity may be the location of the center of gravity for the work machine 100 relative to the chassis 102. Further, the current center of gravity may vary based on the location and weight of the payload section 116 as discussed herein. Accordingly, the controller 126 may determine the current center of gravity in box 406.

In box 408, the controller 126 may communicate with the orientation sensor 128 to identify the current orientation of the work machine 100. The orientation sensor 128 may identify to the controller 126 the current orientation of the work machine 100 relative to a level position and further identify the stability zone 302 based on the current orientation of the work machine 100. More specifically, in box 408 the controller 126 may communicate with the orientation sensor 128 to identify whether the work machine 100 is on a grade or otherwise offset from a level orientation and modify the stability zone 302 accordingly.

Figure 4B:
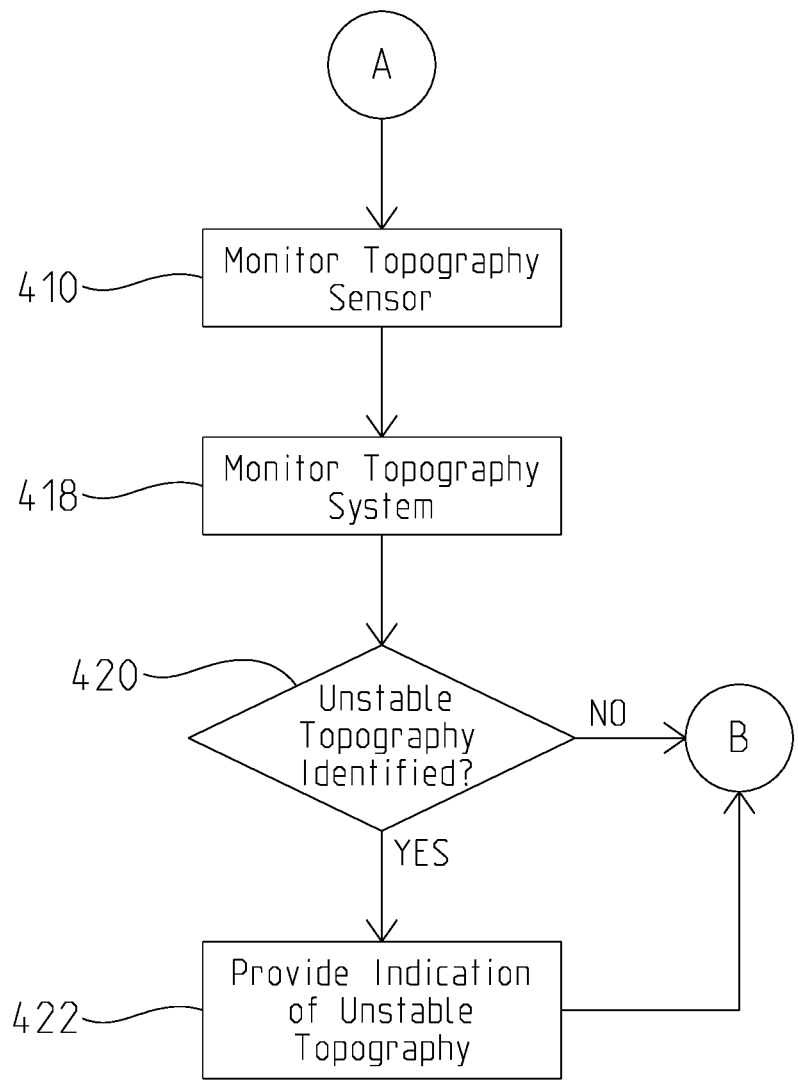

In one aspect of this disclosure, the controller 126 may also execute predictive monitoring in box 409 when the work machine is equipped with one or more of the topography sensor 206 and the topography system 208. The predictive monitoring of box 409 may be utilized to allow the controller 126 to predict upcoming unstable conditions based on the surrounding topography as illustrated in FIG. 4b. Some embodiments of this disclosure may not implement predictive monitoring in box 409 and execute box 412 immediately after box 409. However, other embodiments of this disclosure include considering the surrounding topography to predict upcoming unstable conditions based on the current center of gravity as illustrated in FIG. 4b.

Regardless of whether predictive monitoring is utilized in box 409, the controller 126 may compare the current center of gravity to the current stability zone in box 412. In box 414, the controller 126 determines whether the current COG 300 is within the current stability zone 302 based on the current orientation of the work machine 100 established in boxes 404, 408. If the COG 300 of the work machine 100 identified in box 406 is within the stability zone 302 than the controller 126 may continue to actively execute the previous boxes and monitor the work machine 100. However, if the current orientation of the work machine 100 positions the COG 300 outside of the stability zone 302, the controller 126 may execute box 416 and identify the unstable condition. The controller 126 may identify the unstable condition in box 416 utilizing the user interface 202 to send an auditory, visual, or haptic signal to the user identifying the unstable condition.

The predictive monitoring of box 409 may either be selectively utilized via the user interface 202 or automatically implemented when the controller 126 identifies one or more of the topography sensor 206 and the topography system 208. If predictive monitoring is allowed in box 409, the controller 126 may communicate with the topography sensor 206 in box 410 to identify the topography of the underlying surface 114 surrounding the work machine 100. As discussed herein, the topography sensor 206 may be one or more of a camera, lidar, radar, GPS, and the like and communicate to the controller 126 the condition of the topography around the work machine 100. Further, the controller 126 may execute box 418 as well if a topography system 208 is communicating with the controller through the data link 204. In box 418, the controller 126 may actively update the surrounding topography based on data received from the topography system 208 and compare the topography data to location data of the work machine 100 (such as a GPS data from sensor 130).

In box 420, the controller 126 may utilize the information received from one or more of the topography sensor 206 and the topography system 208 to determine whether the surrounding topography may cause an unstable condition based on the location of the COG 300 determined in box 406. In other words, the controller 126 may simulate the location of the stability zone 302 based on the topographical data of the surrounding underlying surface and determine whether the current COG 300 will be outside of the stability zone 302 if the work machine 100 were to occupy the surrounding area. If the COG 300 will not be outside of the stability zone 302 in the surrounding area, the controller 126 may return to box 412 and finish the logic control system 400.

However, if the COG 300 is outside of the stability zone 302, the controller 126 may execute box 422 and provide an indication of the unstable topography via the user interface 202. In box 422, the controller 126 may utilize a display with warnings along the surrounding areas that would cause an unstable condition. Alternatively, warning lights, sounds, or vibrations may be implemented in box 422 to identify the areas around the work machine 100 that may cause an unstable condition. After or while the indication of box 422 is being implemented, the controller 126 may return to box 412 and finish the logic control system 400.

While the logic control system 400 is described herein substantially sequentially, this disclosure contemplates executing all of the steps discussed herein at substantially the same time as well. Further, this disclosure considers continually executing the logic control system 400 throughout the use of the work machine 100.

Figure 6A:
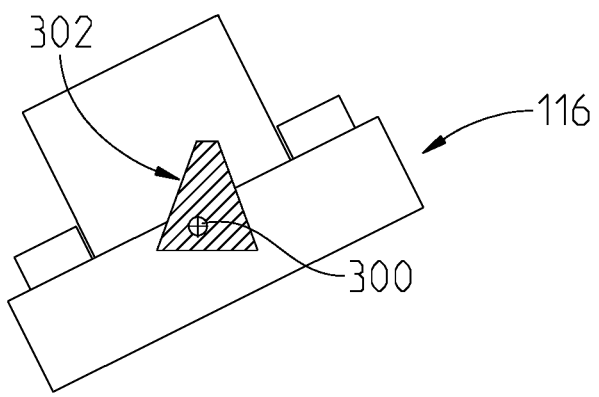
FIG. 6a is a front view of a schematic loader traveling across an offset grade with the payload section in the lowered position.
Figure 6B:
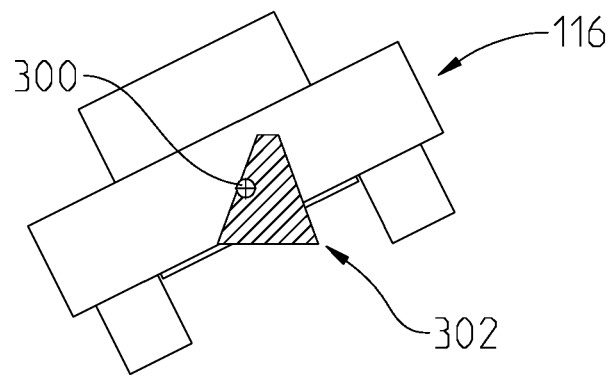
FIG. 6b is a front view of the loader of FIG. 6a traveling across an offset grade with the payload section in the partially raised position.
Figure 6C:
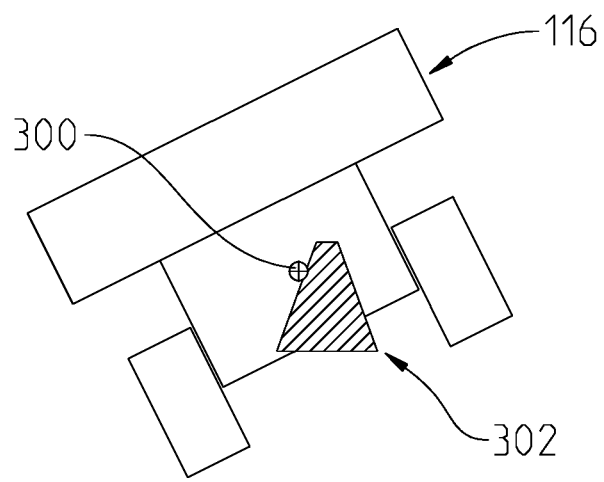
FIG. 6c is a front view of the loader of FIG. 6a traveling across an offset grade with the payload section in the raised position.

The control logic 400 and other teachings of this disclosure may be implemented to determine unstable conditions in any direction of the work machine 100. More specifically, FIGS. 3a-3d illustrate examples of the COG 300 and stability zone 302 being determined while the work machine 100 is on a substantially level underlying surface 114 with the payload section 116 in different configurations. Similarly, FIGS. 5a-5d illustrate determinations of the COG 300 and stability zone 302 as the work machine 100 travels down a hill. Further, FIGS. 6a-5c illustrate determinations of the COG 300 and stability zone 302 as the work machine 100 travels across a hill. As seen in the illustrated examples in the figures, the controller 126 may actively determine the COG 300 and stability zone 302 as the work machine 100 travels through many different orientations of the underlying surface 114. Further, a person skilled in the art understands that the COG 300 and stability zone 302 are defined in three dimensional space. Accordingly, the stability of the work machine 100 is determined based on any possible orientation of the work machine 100.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work machine, comprising:
   a chassis;
   a payload section;
   a controller;
   a payload sensor in communication with the controller; and
   a payload position assembly that identifies to the controller a location of the payload section relative to the chassis;
   wherein, the controller determines a center of gravity for the work machine considering a payload weight identified by the payload sensor and the location of the payload section.

2. The work machine of claim 1, further comprising an orientation sensor on the work machine that identifies the orientation of the work machine to the controller, wherein the controller sends an alert when the location of the center of gravity and the orientation of the work machine create an unstable condition.

3. The work machine of claim 2, further comprising a sensor that communicates with the controller to identify the surrounding topography, wherein the controller considers the surrounding topography and the center of gravity to identify surrounding areas that will cause an unstable condition.

4. The work machine of claim 2, further wherein the alert is one or more of auditory, visual, and haptic feedback.

5. The work machine of claim 3, further wherein the sensor is a camera.

6. The work machine of claim 3, further wherein the sensor is one or more of lidar and radar.

7. The work machine of claim 3, further wherein the sensor is a combination of a camera and one or more of lidar and radar.

8. The work machine of claim 3, further wherein the sensor is a GPS sensor.

9. The work machine of claim 8, further wherein the controller accesses a topographical map and compares location identified by the GPS sensor to the topographical map to identify the surrounding areas that will cause an unstable condition.

10. The work machine of claim 9, wherein the topographical map is selectively updated by an aerial topographical system.

11. A method for identifying an unstable condition of a work machine, comprising:
    providing a chassis, a controller, a payload weight sensor, and a payload position assembly;
    communicating to the controller with the payload weight sensor a weight of payload present in a payload section;
    communicating to the controller with the payload position assembly a location of the payload section relative to the chassis; and
    determining a center of gravity for the work machine with the controller using the weight of payload and the location of the payload section.

12. The method of claim 11, further comprising:
    providing an orientation sensor on the work machine;
    communicating orientation values from the orientation sensor to the controller;
    determining the orientation of the work machine with the controller based on the orientation values;
    wherein, the controller sends an alert when the location of the center of gravity and the orientation of the work machine create an unstable condition.

13. The method of claim 11, further comprising:
    providing a topography sensor that communicates with the controller to identify a surrounding topography; and
    considering the surrounding topography, with the controller utilizing the topography sensor, and the center of gravity to identify surrounding areas that will cause an unstable condition.

14. The method of claim 13, further wherein the topographical sensor is a GPS sensor monitored by the controller to identify a vehicle location and the controller accesses a topographical map, wherein the controller compares the vehicle location to the topographical map to identify the surrounding areas that will cause the unstable condition.

15. The work machine of claim 14, wherein the controller communicates with an aerial topographical system to selectively update the topographical map.

16. A method for warning of instability in a work machine, comprising:
    providing a chassis having a payload section, a payload sensor in communication with a controller, an orientation sensor in communication with the controller, and a user interface;
    identifying a weight of material in the payload section with the controller through the payload sensor;
    determining a center of gravity of the work machine with the controller considering the weight of material in the payload section;
    monitoring the orientation sensor with the controller to identify an orientation of the work machine;
    identifying an unstable condition with the controller when the center of gravity and orientation of the work machine indicate the center of gravity is outside of a stability zone; and
    providing a warning with the user interface to identify the unstable condition.

17. The method of claim 16, further comprising identifying a surrounding topography with the controller and predicting unstable conditions caused by the surrounding topography.

18. The method of claim 17, further comprising providing an indication with the user interface identifying the predicted unstable condition.

* * * * *